Figure 3:
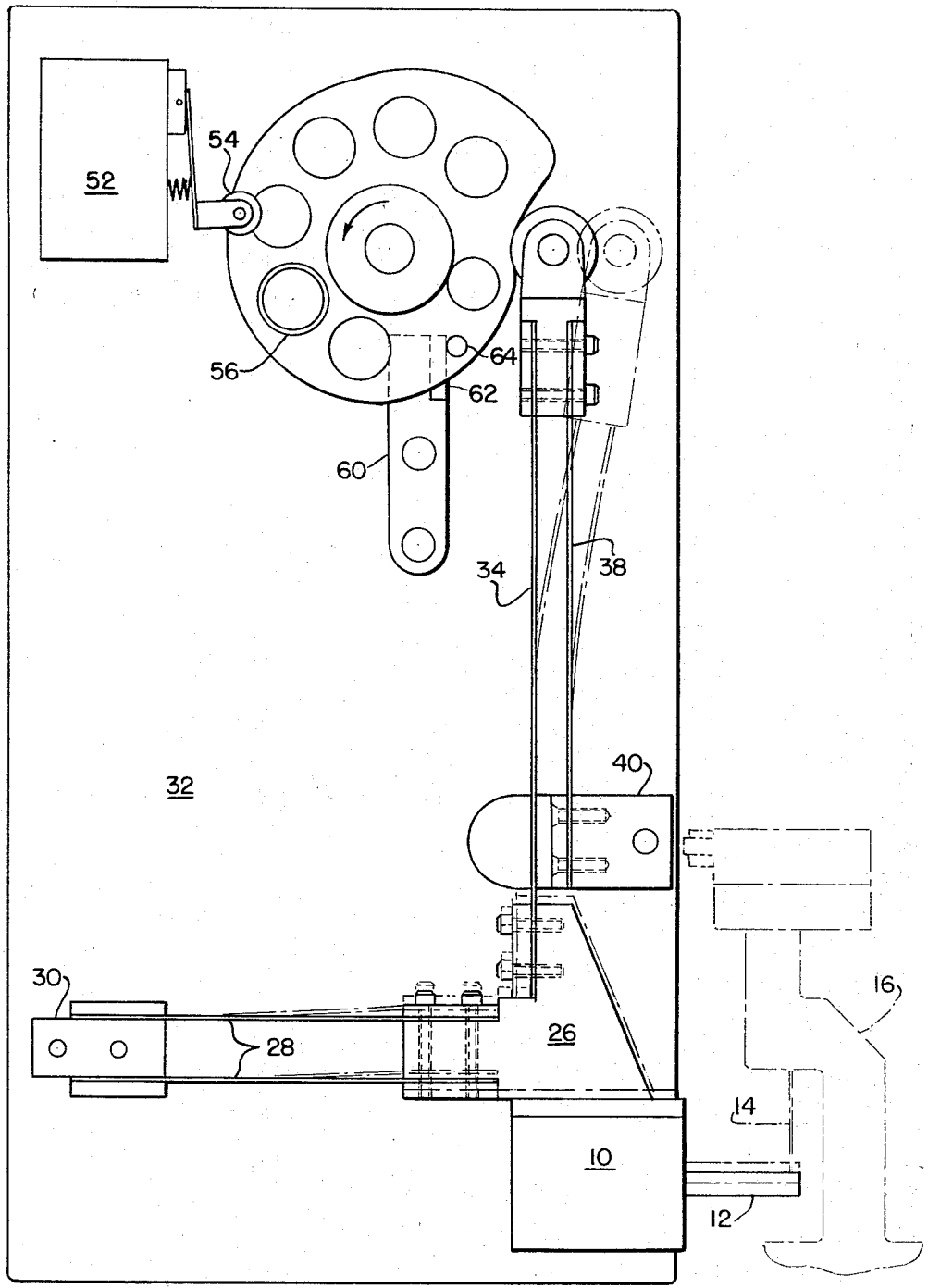

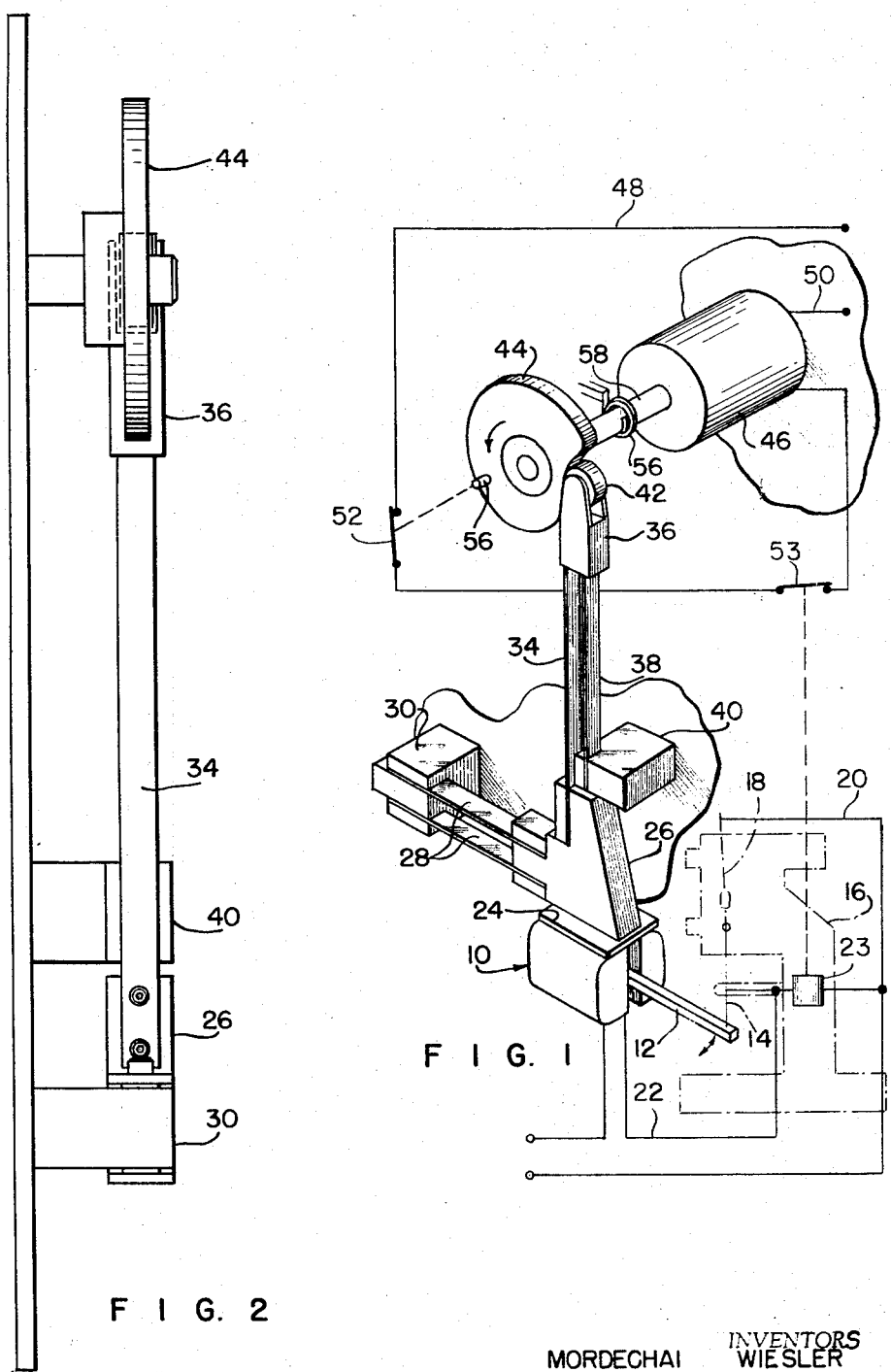

United States Patent Office 3,292,248
Patented Dec. 20, 1966

3,292,248
PRECISION ADVANCE MECHANISM
Mordechai Wiesler, Brookline, and Avigdor Goren, Cambridge, Mass., assignors to Transistor Automation Corp., Cambridge, Mass., a corporation of Massachusetts
Filed Oct. 29, 1963, Ser. No. 319,711
11 Claims. (Cl. 29—203)

This invention relates generally to advance mechanisms and more particularly is directed towards a new and improved apparatus for moving a component over a limited distance precisely into a predetermined position relative to another component.

In the manufacture and assembly of precision products, it is very often necessary to move two components into precise relation with respect to one another. For example, in assembling solid state diodes, it is of the utmost importance that the whisker be moved against the crystal element with a high degree of accuracy in order for the component to function properly. Tolerances for such devices must be held to very close standards, since any small error may produce a defective device.

Normally, the assembling of precision components, such as solid state diodes, for example, has been carried out manually. This practice is quite time consuming and expensive and, in addition, results in a high percentage of rejects. Various mechanisms have been devised to carry out this operation automatically, but heretofore such mechanisms have been mechanically complicated, expensive and lacking a high degree of precision.

Accordingly, it is an object of the present invention to provide improvements in part-positioning devices.

Another object of this invention is to provide a relatively simple, reliable and low-cost apparatus for moving a component precisely into an exact predetermined position relative to another component.

A still further object of this invention is to provide an automatic part-advancing mechanism adapted to stop completely the advance of the part being moved at an exact, predetermined position.

More particularly, this invention features a torque motor carrying an arm adapted to engage and advance a movable component to a precise, predetermined position with respect to another component. The motor is supported by two sets of spaced parallel springs, one set being disposed horizontally and the other set being disposed vertically. The horizontal springs typically are elongated flat springs both fixed at one end and having their opposite ends supporting the motor. The vertical springs typically are also elongated flat springs arranged in spaced, parallel relation connected at their upper ends with the lower end of one supporting the motor and the lower end of the other being fixed. Means are provided for bending the vertical springs through the same plane to thus cause a vertical displacement of the supported motor and arm whereby the moveable component is advanced towards the other component. Upon reaching the predetermined position, the torque motor is immediately actuated, and the arm is biased out of driving engagement with the movable components.

The invention also features a novel motor driven cam arrangement for bending the vertical springs whereby the cam is returned to a start position after each cycle of operation.

But these and other features of the invention, along with further objects and advantages thereof, will become more fully apparent from the following detailed description of a preferred embodiment of the invention, with reference being made to the accompanying drawings, in which:

FIG. 1 is a view in perspective, somewhat schematic, of part-positioning apparatus made according to the invention, FIG. 2 is a view in end elevation of the apparatus, and, FIG. 3 is a view in side elevation thereof.

Referring now to the drawings, the reference character 10 generally indicates a torque motor having a pivotally mounted and outwardly extending armature 12 adapted to engage a movable component such as the lower end of a lead 14 for a solid state diode, for example. The advance mechanism has particular utility in the positioning of components for semiconductor diodes, and the like, and for such applications the apparatus may be used in conjunction with a diode-sealing device 16 of the sort shown in our co-pending patent application entitled "Sealing Head for Glass Diodes." In that application, there is disclosed a device for frictionally holding the lead 14 in precise axial alignment with a lead 18 whereby the two leads may be brought into contact with one another and heat sealed.

As shown in FIG. 1, leads 20 and 22, which are associated with the sealing device 16, make contact with the diode leads 14 and 18 and also are in circuit with the torque motor 10, a relay 23 and a suitable power source. In practice, the circuit for the torque motor 10 is normally open until the diode components are brought into contact with one another. When the contact is made, the circuit for the motor is closed and this causes the armature 12 to flip downwardly and out of contact with the lead 14.

The torque motor 10 is mounted by a plate 24 to the underside of a block 26. Fastened to the rear portion of the block 26 are a pair of spaced, parallel, horizontal, flat springs 28, the outer ends of which are fastened to a fixed block 30 mounted on a supporting panel 32.

Mounted perpendicularly to the springs 28 is a flat, vertically disposed spring 34, the lower end of which is connected to the upper portion of the block 26 while the upper end of the spring 34 is attached to a yoke 36. Mounted in spaced parallel relation to the spring 34 is another vertical flat spring 38, the upper end of which is attached to the same yoke 36 while the lower end thereof is fixed to a block 40 secured to the panel 32. The yoke 36 will be seen to carry a roller 42 which serves as a follower for a cam 44 rotated by a sunchronous motor 46.

The motor 46 is energized by leads 48 and 50 which are interrupted by a normally closed micro-switch mounted on the panel 32 and a relay switch 53. The switch 52 is provided with a roller 54 adapted to engage a trip 56 mounted near the periphery of the cam 44. In the drawings, the cam is shown in a start position and is adapted to rotate under power in a counterclockwise direction as viewed in FIGS. 1 and 3. In practice, as the cam is rotated its lobe will cause the follower 42 to be laterally displaced as suggested in FIG. 3. This will bend both of the vertical springs 34 and 38 to the right and, since the spring 38 is fixed at its lower end, this will cause the lower end of the spring 34 to be moved upwardly thereby raising the block 26, the torque motor 10 and the armature 12 to advance the diode lead 14 towards the lead 18. With the ends of the horizontal springs 28 being rigidly connected to one another a true vertical displacement of the block 26 is produced upon bending of the vertical springs. When the lead 14 makes contact with the lead 18, the circuit to the torque motor 10 is completed and the armature 12 is flipped down and out of the way, thereby completely stopping the advance of the lead 14. Simultaneously the coil for the relay 23 is energized to open the switch 53 and thereby stop the motor 46.

If the diode parts are not brought into contact with a cycle of the cam 14, the trip 56 will bear against the roller 54 for the micro-switch 52 causing the switch to open and thereby de-energize the motor 46. With the motor 46 de-energized, the cam 44 will be rotated clockwise to a start position by means of a flat, spiral return spring 56, one end of which is fixed while the other end is wound about a drive shaft 58. It will be understood that as the cam and shaft are rotated counterclockwise under the power of the motor 46, the return spring will be wound into a tensioned condition which will be released upon the de-energization of the motor 46. The return movement of the cam is limited by means of a stop 60 fastened to the panel 32 and provided with a resilient cushion 62 of rubber, or the like, adapted to engage a pin 64 mounted on the cam.

The mechanism illustrated and described herein provides very precise control over the advance of the component that is being moved and permits assembling of parts under extremely close tolerances. In practice the spring 34 is connected in such a fashion that its lower end will be pulled upwardly in a 10 to 1 ratio with respect to lateral displacement of the cam follower 42. This advantageous ratio provides for very precise control over the advance of the part that is being positioned. In practice, the diode sealing device 16 is provided with means for frictionally engaging the diode lead 14 so that the armature 12 may advance the lead to a predetermined position and the lead will remain in such position after the armature 12 has been flipped out of contact with the lead.

Since it is extremely critical that the diode lead 14 stop precisely upon contact wtih the lead 18, the torque operated armature 12 is provided since actuation of the torque motor 10 will immediately stop the advance of the lead 14 by moving the arm 12 quickly out of contact therewith. Thus the lead 14 will stop dead even though the torque motor may be carried a little higher by momentum. The torque motor and armature arrangement thus provides a very fast response to the electrical pulse developed upon contact of the diode leads 14 and 18.

By the employment of parallel flat springs, a friction-free suspension is provided for the torque motor in addition to a simple, durable and dependable mechanism capable of advancing components with extreme precision and particularly well adapted for the mass production of semiconductor devices. In a typical mechanism made according to the invention, the advance may be set for .05" for example with the advance after the position has been sensed being between .0002" and .005". Repeatability of any set advance is on the order of ±.0001".

While the invention has been described wtih particular reference to the illustrated embodiment, it will be understood that numerous modifications thereto will appear to those skilled in the art. Also, while the apparatus has been described with particular reference to its application in the assembling of solid state diodes, it may be used with equal advantage in the assembling of a great variety of precision instruments by reason of its ultra-accurate positioning capabilities. Also, it will be understood that the above description and accompanying drawings should be taken as illustrative of the invention and not in a limiting sense.

Having thus described the invention, what we claim and desire to obtain by Letters Patent of the United States is:

1. An apparatus for positioning a movable part in precise relation to another part, comprising a supporting structure, a part position sensor, a member adapted to engage said movable part, a first pair of normally vertical spaced and facing parallel leaf springs supporting said member, said springs being connected in fixed relation to one another at their upper portions, the lower end of one of said springs being fixed to the supporting structure and the lower end of the other of said springs being connected to said member, a second pair of normally horizontal spaced and facing parallel leaf springs fixed to said supporting structure at one end and connected to said member at the other, drive means for flexing said springs by laterally displacing the upper end of said pair of vertical springs whereby said member and said movable part will be displaced vertically and pivoting means responsive to said part position sensor for pivoting said member downwardly after said movable part has been positioned.

2. An apparatus according to claim 1 wherein said drive means includes a motor driven cam and a follower mounted at the upper end of said first pair of springs.

3. An apparatus according to claim 2 including spring means for returning said cam to a start position.

4. An apparatus according to claim 1 wherein said responsive means includes a torque motor adapted to be energized by said sensor.

5. An apparatus for positioning a movable part in precise relation to another part, comprising a supporting structure a member adapted to engage said movable part, a first pair of normally vertical spaced and facing parallel leaf springs supporting said member, said first pair of springs being connected in fixed relation to one another at their upper portions, the lower end of one of said first pair of springs being connected to said member and the lower end of the other of said first pair of springs being fixed to said supporting structure, a second pair of normally horizontal spaced and facing parallel leaf springs fixed to said supporting structure at one end and connected to said member at the other and means for bending said vertical springs whereby said member and said movable parts will be displaced vertically.

6. An apparatus according to claim 5 including motor means adapted to bias said member away from said movable part upon reaching a predetermined position.

7. An apparatus according to claim 5 wherein said bending means includes a motor driven cam.

8. An apparatus for positioning a movable part in precise relation to another part, comprising a supporting structure, an arm adapted to engage said movable part, a torque motor supporting said arm, a first pair of normally vertical spaced parallel and facing leaf spring supporting said torque motor, said springs being connected in fixed relation to one another at their upper portions, the lower end of one of said springs being connected to said torque motor and the lower end of the other spring being fixed to the supporting structure, a second pair of normally horizontal spaced and facing parallel leaf springs fixed to the supporting structure at one end and connected to said torque motor at the other, a motor driven cam mounted to said supporting structure for laterally displacing the upper ends of said vertical springs whereby said torque motor arm and said movable part will be displaced vertically and means for energizing said torque motor to pivot said arm away from said movable part upon reaching a predetermined position.

9. An apparatus according to claim 8 including means for stopping said cam upon completion of a predetermined movement thereof and means for returning said cam to a start position.

10. An apparatus according to claim 8 including a follower roller mounted at the upper portion of said pair of vertical springs for engagement with said cam.

11. An apparatus for positioning a movable part in precise relation to another part, comprising a supporting structure, a member adapted to engage said movable part, a first pair of normally flat parallel and facing springs for supporting said member, said springs being joined in fixed relation to one another at one end, the opposite end of one of said springs being fixed to said supporting structure and the opposite end of the other of said springs being connected to said member, means restraining said member for movement only in one plane, said plane being coplanar with said other spring and drive means for laterally displacing the upper ends of said springs whereby said member and said movable part will be displaced in said plane.

References Cited by the Examiner

UNITED STATES PATENTS 2,757,440    8/1956    Carman _____ 29—25.3

JOHN F. CAMPBELL, *Primary Examiner.*

WILLIAM I. BROOKS, *Examiner.*